(12) United States Patent
Biberstein et al.

(10) Patent No.: US 7,412,692 B2
(45) Date of Patent: Aug. 12, 2008

(54) DETERMINING MINIMAL SETS OF BUG SOLUTIONS FOR A COMPUTER PROGRAM

(75) Inventors: Marina Biberstein, Qiryat Mozkin (IL); Shay Bushinsky, Ganei Tikva (IL); Eitan Farchi, Pardes Hanna (IL); Shmuel Ur, D.N. Misgav (IL)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 10/746,573

(22) Filed: Dec. 24, 2003

(65) Prior Publication Data
US 2005/0160317 A1 Jul. 21, 2005

(51) Int. Cl.
G06F 9/44 (2006.01)
(52) U.S. Cl. .................. 717/124; 717/127; 717/130
(58) Field of Classification Search ......... 717/106–109, 717/124, 125–135
See application file for complete search history.

(56) References Cited

OTHER PUBLICATIONS

Y. Gueheneuc and H. Albin-Amiot, "Using design patterns and constraints to automate the detection and correction of inter-class design defects", 2001, Proceedings of TOOLS USA, 2001.*

D. Heuzeroth and T. Holl and W. Lowe, "Combining static and dynamic analyses to detect interaction patterns", 2002, in IDPT, 2002.*

Dauzere-Peres and Sevaux "Using Lagrangean Relaxation to Minimize the (Weighted) Number of Late Jobs on a Single Machine" Jun. 28, 1999.*

Albin-Amiot Cointe Gueheneuc and Jussien "Instantiating and detecting design patterns: putting bits and pieces together" 2001, Proceedings. 16th Annual International Conference on Automated Software Engineering, 2001. (ASE 2001). □□.*

Narendra Jussien and Vincent Barichard, "The PaLM system: explanation-based constraint programming", 2000, Proceedings of TRICS: Techniques foR Implementing Constraint programming Systems, pp. 1-13.*

* cited by examiner

Primary Examiner—Meng-Al T. An
Assistant Examiner—Jason Mitchell

(57) ABSTRACT

A method for determining a required solution subset from a set of solutions for eliminating a computer program execution error is provided. The method includes selecting a first candidate solution subset from a set of solutions for a computer program that produces an error when executed, wherein each of the solutions represents a different proposed modification of the program for eliminating the execution error, applying the first candidate solution subset to the computer program, thereby creating a first version of the program, selecting a second candidate solution subset from the set of solutions, applying the second candidate solution subset to the program, thereby creating a second version of the program, executing the first and second program versions to determine whether either of the executed program versions produces the error, adding the difference between the first and second candidate solution subsets to a required solution subset, when one of the executed program versions produces the error, and the other of the executed program versions does not produce the error, applying the required solution subset to the program, thereby creating a third version of the program, executing the third program version to determine whether the executed third version of the program produces the error and, if the third version of the program produces the error, repeating the above steps for different candidate solution subsets until the third version of the program does not produce the error.

2 Claims, 16 Drawing Sheets

DETERMINING MINIMAL SETS OF BUG SOLUTIONS FOR A COMPUTER PROGRAM

FIELD OF THE INVENTION

The present invention relates to computer programming and testing in general, and in particular to determining minimal sets of bug solutions therefor.

BACKGROUND OF THE INVENTION

Computer programs, such as multi-threaded programs, typically run in a computer environment where the Operating System (OS), such as Microsoft Windows®, and possibly a runtime environment as well, such as the Java® Virtual Machine® (JVM), control one or more executable program threads, where an executable program is associated with a thread at a particular time. In addition, each executable program may access a shared resource, such as shared memory.

The interactions between the OS, threads, executable program and shared resource may produce chaotic behavior. This is primarily due to the complexity of the computer environment and the effect that small perturbations may have on the executable program's results. These perturbations have numerous causes and manifestations, most notably related to the timing of executed program instructions, and often result in intermittent execution errors that may be traced back to a programming error or "bug."

In addition to using manual techniques to detect programming errors, automated bug detection tools may be used. While existing bug detection tools provide information regarding the performance and validity of typical computer programs, increasingly complex programs have created a need for more sophisticated bug detection techniques. This is particularly true with regard to multi-threaded computer programs where program execution errors may be caused by environmental factors that may make bugs more elusive.

SUMMARY OF THE INVENTION

The present invention discloses a system and method for determining a solution set for bugs found in computer programs, such as a multi-threaded computer programs. In the present invention a computer program P is defined to have a bug B when the execution of P produces a result R that does not satisfy requirements Q. For example, a multi-threaded program having 10 threads, each incrementing a shared zero-initialized variable in an unsynchronized manner, may be expected during bug-free execution to produce a result of 10. However, due to a bug that occurs under certain circumstances, such as when the program is executed under the influence of an automated testing tool, the result of the program is 5. In this example the program P is an accumulator, the result R is 5, while the requirements for successful execution Q is 10.

One or more bug patterns are identified in P from a set of predefined bug patterns, and a solution space is defined that includes a set of candidate solutions for eliminating bug B. These solutions may include modifications to P, such as protecting shared variables with synchronization points. Furthermore, a single candidate solution may include multiple types of modifications to P, such as modifying synchronization points and replacing shared variables with local variables. The solution space of candidate solutions is then searched to determine a minimal set of solutions that will eliminate bug B.

In one aspect of the present invention a system is provided for automated bug detection and solution including a testing tool operative to record execution behavior and output of a computer program, and a determiner including a bug pattern detector operative to analyze the program execution behavior and output to identify a bug pattern therein and propose at least one program modification for effecting a solution to eliminate the bug pattern, a solution query & search module operative to iteratively define a plurality of subsets of the proposed solutions in accordance with a predefined selection criterion, and a bug solution inserter operative to iteratively apply the subsets of proposed solutions to the program.

In another aspect of the present invention the testing tool is operative to introduce perterbations into the program.

In another aspect of the present invention the bug pattern is predefined.

In another aspect of the present invention the solution is in predefined association with the predefined bug pattern.

In another aspect of the present invention the solution query & search module is operative to identify any of the solution subsets that satisfies a predefined solution criterion.

In another aspect of the present invention the predefined solution criterion is whether any of the subsets has the fewest members among all of the subsets that together eliminate the bug pattern.

In another aspect of the present invention the predefined solution criterion is whether, after a predefined number of iterations, any of the subsets that have been applied to the program has the fewest members among all of the subsets that together eliminate the bug pattern.

In another aspect of the present invention the predefined solution criterion is whether any of the subsets has a member population smaller than a predefined size that together eliminate the bug pattern.

In another aspect of the present invention a method is provided for determining a required solution subset from a set of solutions for computer program execution errors, the method including a) selecting a first candidate solution subset from a set of solutions, b) applying the first candidate solution subset to a computer program, thereby creating a first version of the program, c) selecting a second candidate solution subset from the set of solutions, d) applying the second candidate solution subset to the program, thereby creating a second version of the program, e) adding the difference between the first and second candidate solution subsets to a required solution subset where one of the program versions satisfies a predefined set of requirements, and the other of the program versions does not satisfy the predefined set of requirements, and f) performing steps a)-e) a plurality of times for different candidate solution subsets until the required solution subset satisfies the predefined set of requirements.

In another aspect of the present invention the adding step includes adding where the populations of the candidate solution subsets differ by one member.

In another aspect of the present invention the performing step includes performing until the application of the required solution subset to the program eliminates a predefined set of execution errors when the program is executed.

In another aspect of the present invention a method is provided for determining a solution subset from a set of solutions, the method including a) selecting a first candidate solution subset from a set of solutions, b) selecting a second candidate solution subset from the set of solutions, c) adding the difference between the first and second candidate solution subsets to a required solution subset where one of the candidate solution subsets satisfies a predefined set of requirements, and the other of the candidate solution subsets does not satisfy the predefined set of requirements, and d) performing steps a)-c) a plurality of times for different candidate solution subsets until the required solution subset satisfies the predefined set of requirements.

In another aspect of the present invention the adding step includes adding where the populations of the candidate solution subsets differ by one member.

In another aspect of the present invention a computer program is provided embodied on a computer-readable medium, the computer program including a first code segment operative to select a first candidate solution subset from a set of solutions, a second code segment operative to applying the first candidate solution subset to a computer program, thereby creating a first version of the program, a third code segment operative to selecting a second candidate solution subset from the set of solutions, a fourth code segment operative to applying the second candidate solution subset to the program, thereby creating a second version of the program, and a fifth code segment operative to adding the difference between the first and second candidate solution subsets to a required solution subset where one of the program versions satisfies a predefined set of requirements, and the other of the program versions does not satisfy the predefined set of requirements, where any of the code segments may be executed a plurality of times for different candidate solution subsets until the required solution subset satisfies the predefined set of requirements.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
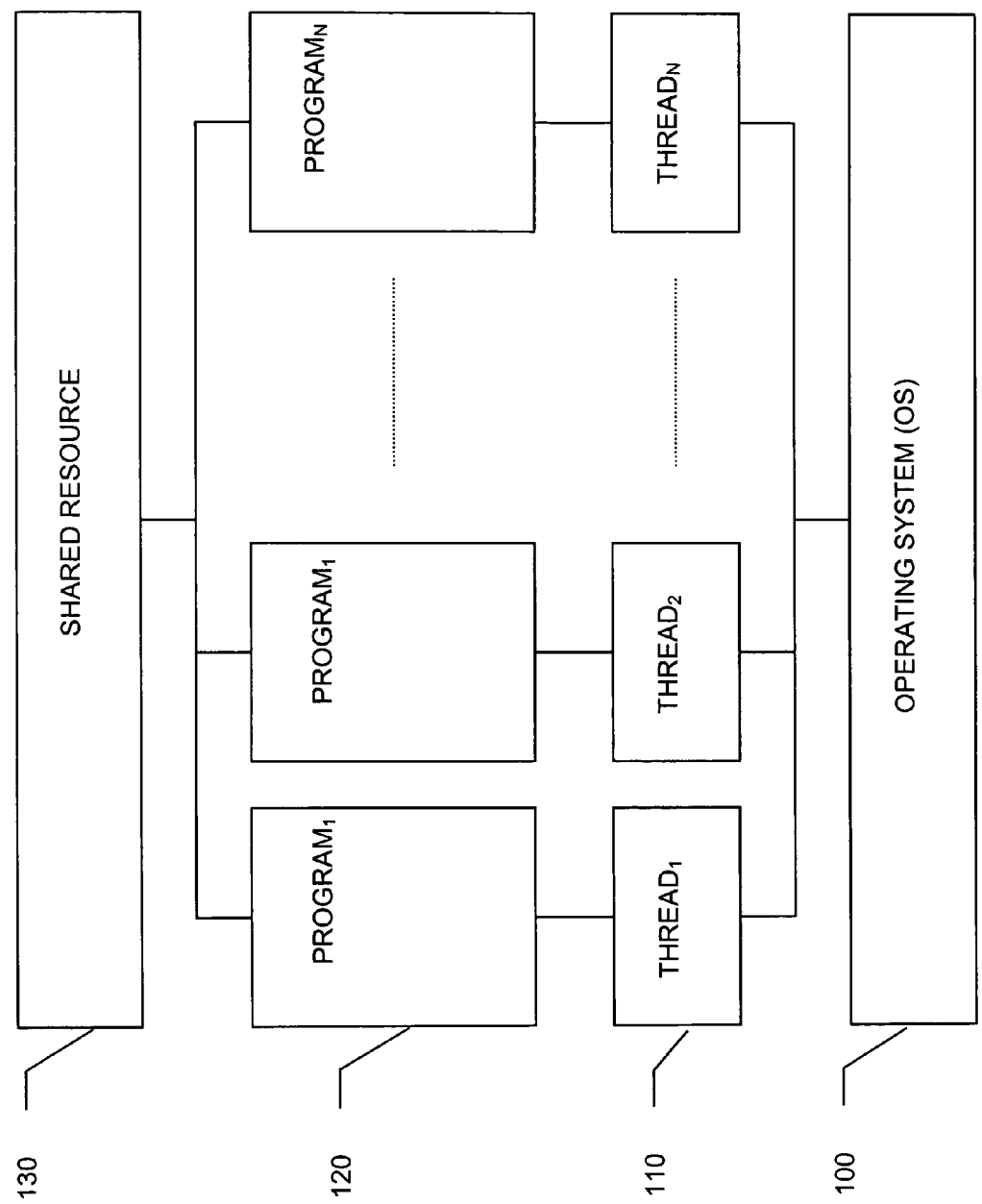
FIG. 1 is a simplified illustration of a program execution environment, useful in understanding the present invention.

Reference is now made to FIG. 1, which is a simplified illustration of a program execution environment, useful in understanding the present invention. FIG. 1 shows a program execution environment in which an Operating System 100 fixes an association at a particular time between a unique Thread 110 and a unique Program 120. The associations between programs and threads are illustrated through the use of subscripts. Thus, Operating System 100 associates each of Threads 110 with one of the Programs 120 at a particular time for processing, where $Thread_1$ may be associated with $Program_1$ at a particular time, and $Thread_2$ may be associated with $Program_2$ at the same time or at a different time.

Multiple programs may access a Shared Resource 130 during their execution, such as shared memory. It is typically the responsibility of the software developer to ensure that concurrent access of Shared Resource 130 by programs does not result in a conflict of Shared Resource 130.

Figure 2:
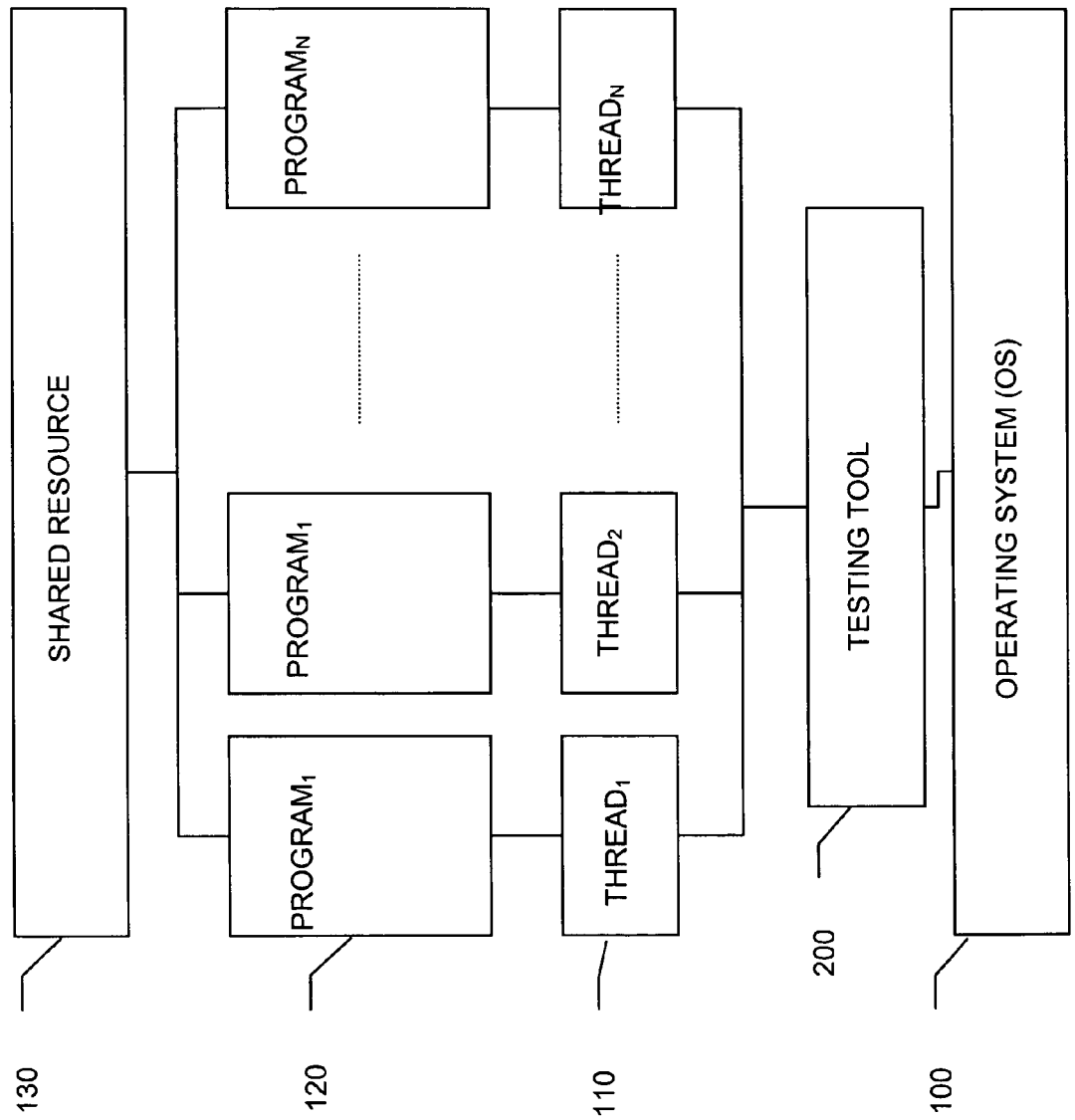
FIG. 2 is a simplified illustration of a program testing environment, useful in understanding the present invention.

Reference is now made to FIG. 2, which is a simplified illustration of a program testing environment, useful in understanding the present invention. Typically a software developer will test programs in a controlled environment. The introduction of simulated 'real life' factors may produce perturbations in the program's execution environment, which in turn may result in program execution errors. To help simulate these perturbations, sophisticated testing tools have been developed, such as the ConTest® tool, described in Edelstein et al. "Multithreaded Java program test generation," IBM Systems Journal, volume 41, number 1, page 111 (2002). FIG. 2 illustrates the insertion of such a Testing Tool 200 between Operating System 100 and Thread 110. Testing Tool 200 is capable of providing input and/or simulating perturbations that may exist during normal program operation. For example, Testing Tool 200 may halt the execution of Thread 110 or change the sequence in which $Thread_1$ is activated, by Operating System 100 relative to $Thread_2$. Testing Tool 200 is also preferably capable of performing a program execution trace to record program execution behavior and output.

Figure 3:
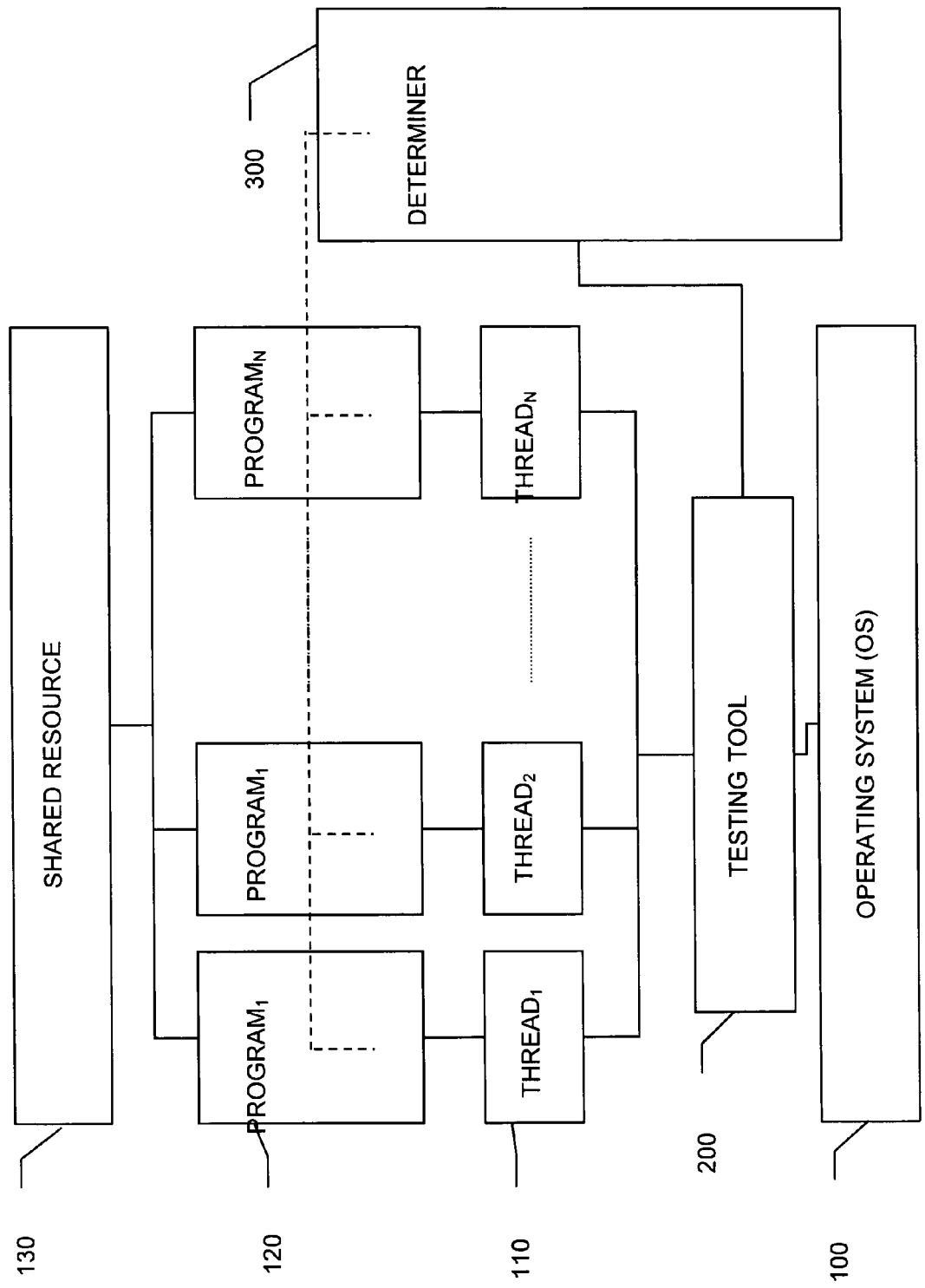
FIG. 3 is a simplified illustration of an automated bug detection and solution environment, constructed and operative in accordance with a preferred embodiment of the present invention.
Figure 4:
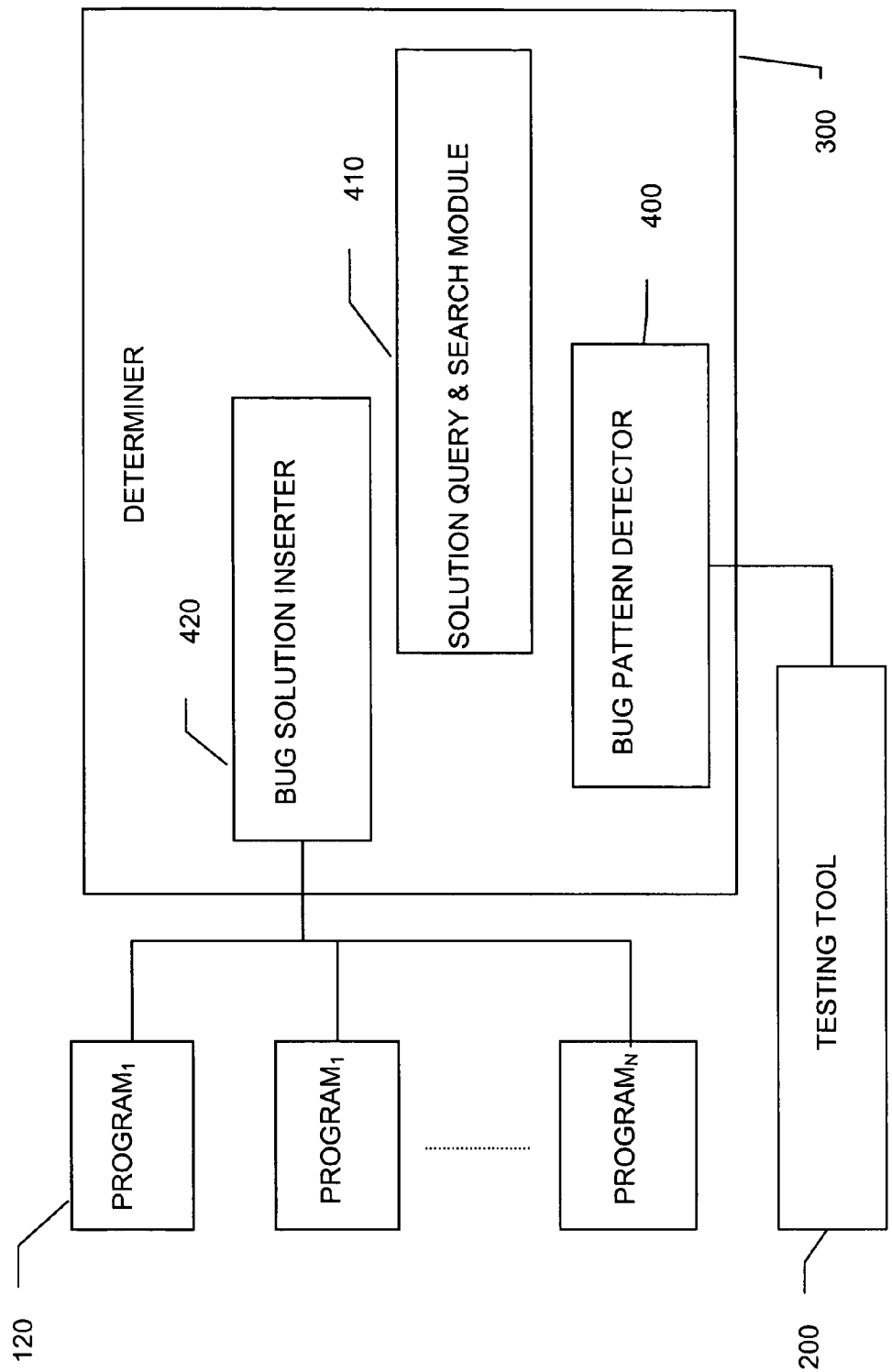
FIG. 4 is a simplified illustration of selected elements of FIG. 3, constructed and operative in accordance with a preferred embodiment of the present invention.

Reference is now made to FIGS. 3 and 4, which are simplified illustrations of an automated bug detection and solution environment, constructed and operative in accordance with a preferred embodiment of the present invention. In FIGS. 3 and 4 a Determiner 300 receives input from Testing Tool 200 and applies modifications to Program 120. As shown in FIG. 4, Determiner 300 typically includes a Bug Pattern Detector 400, a Solution Query & Search Module 410 and a Bug Solution Inserter 420.

Bug Pattern Detector 400 analyzes the program execution behavior and output recorded by Testing Tool 200 to identify bug patterns in Program 120 in accordance with conventional techniques. One such technique is described in Farchi et al. "Concurrent Bug Patterns and How to Test Them," Proceedings of the 17th International Parallel and Distributed Processing Symposium (IPDPS 2003), 22-26 April 2003, Nice, France, published by the IEEE Computer Society, ISBN 0-7695-1926-1, p. 286, in which one or more bug patterns are predefined. For each bug pattern that is identified, Bug Pattern Detector 400 may propose one or more program modifications as solutions for eliminating the bug pattern that may likewise be predefined and associated with the predefined bug patterns. For example, Bug Pattern Detector 400 may employ Finite State Automata (FSA) to associate one or more solutions to a bug pattern. FSA's are well known in the art for providing probabilistic associations between statistically significant options. The program modifications are preferably "safe" modifications that will not cause a correct program to fail. For example, safe modifications in the context of multi-threaded, concurrent, and distributive applications include synchronization on a non-blocking segment, adding a sleep statement, changing the length of a sleep statement, blocking threads until others do not do anything useful, performing a join on non-blocking threads, putting empty synchronization statements to flash the memory, and waiting for an event that is known will happen.

Solution Query & Search Module 410 receives one or more solutions from Bug Pattern Detector 400, and formulates a query that provides a mechanism for performing a search of a solution space to determine sets of solutions. A preferred method of operation of Solution Query & Search Module 410 is described in greater detail hereinbelow with reference to FIGS. 5 and 6.

Bug Solution Inserter 420 modifies Program 120 in accordance with the solution set provided by Solution Query & Search Module 410 in accordance with conventional techniques.

Figure 5A:
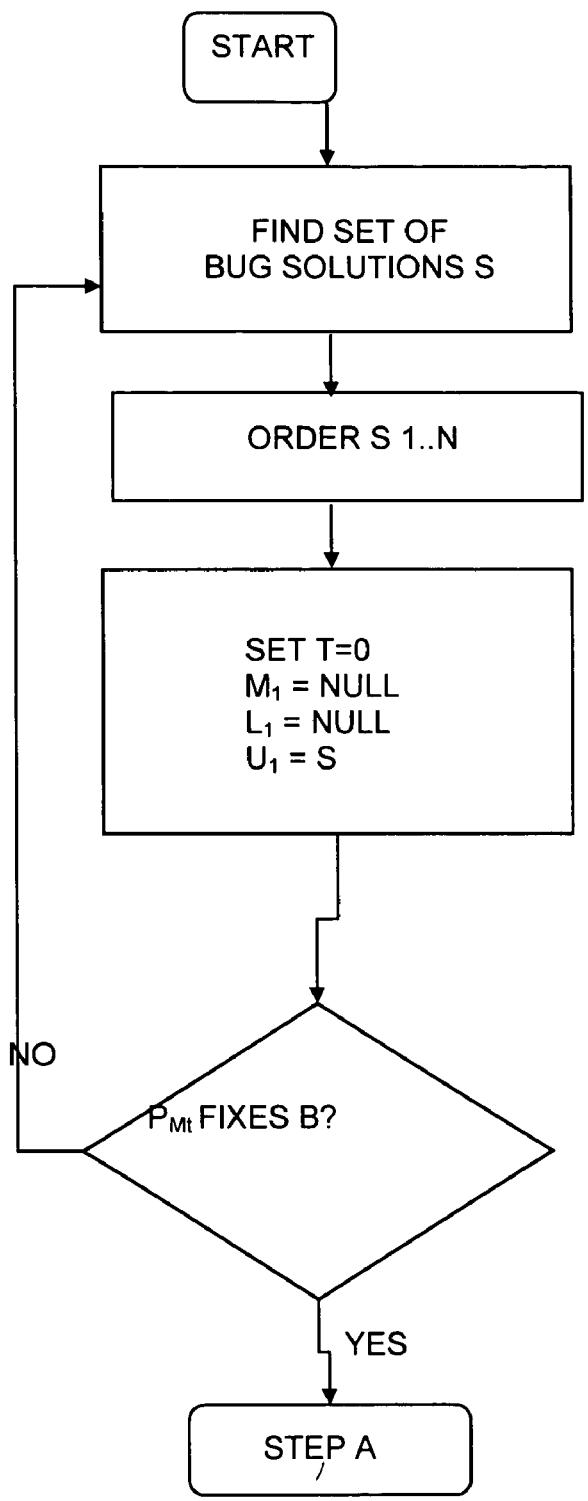
FIGS. 5A-5C, taken together, is a simplified flowchart illustration of a method for automated bug detection and solution, operative in accordance with a preferred embodiment of the present invention.
Figure 5B:
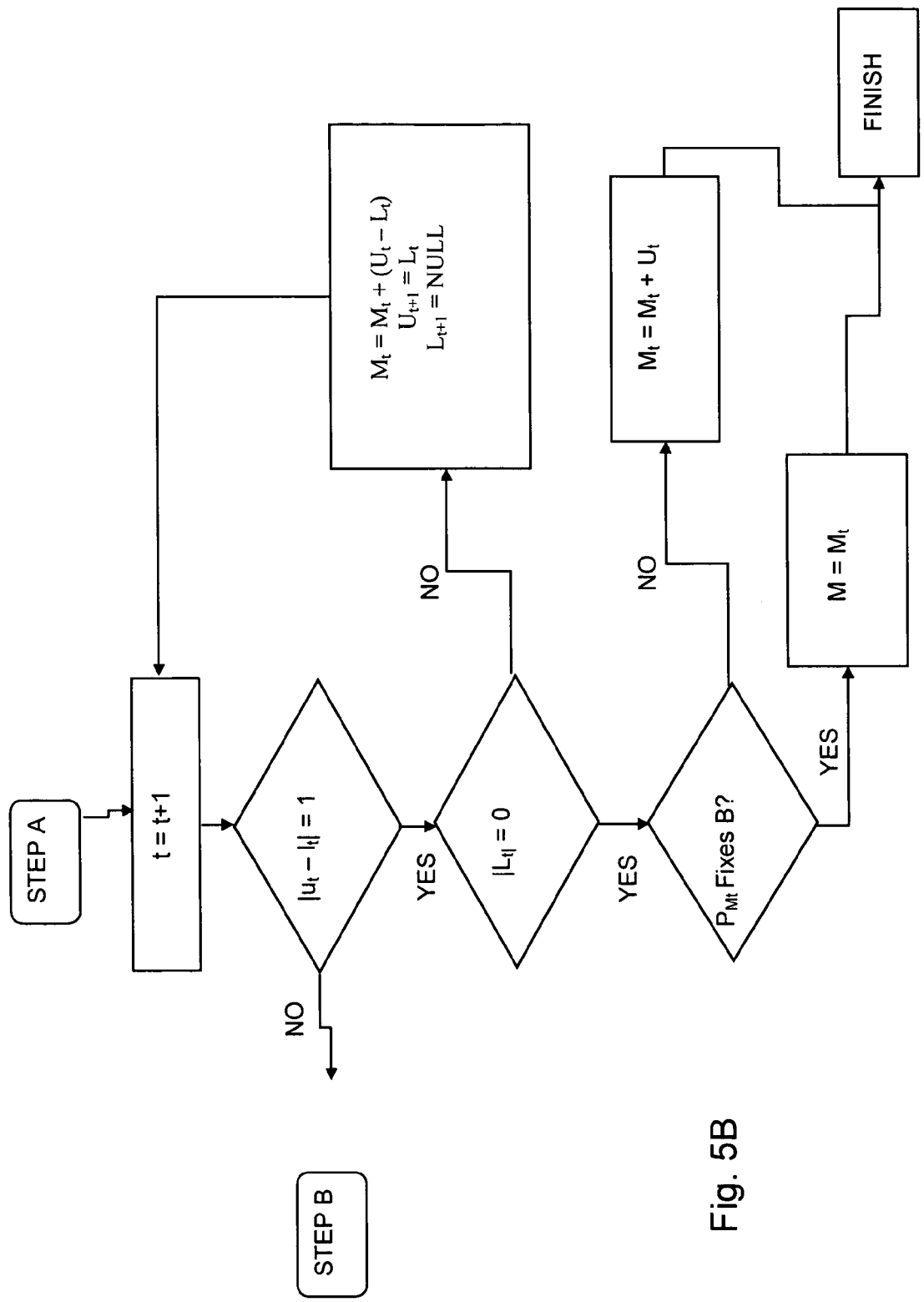
Figure 5C:
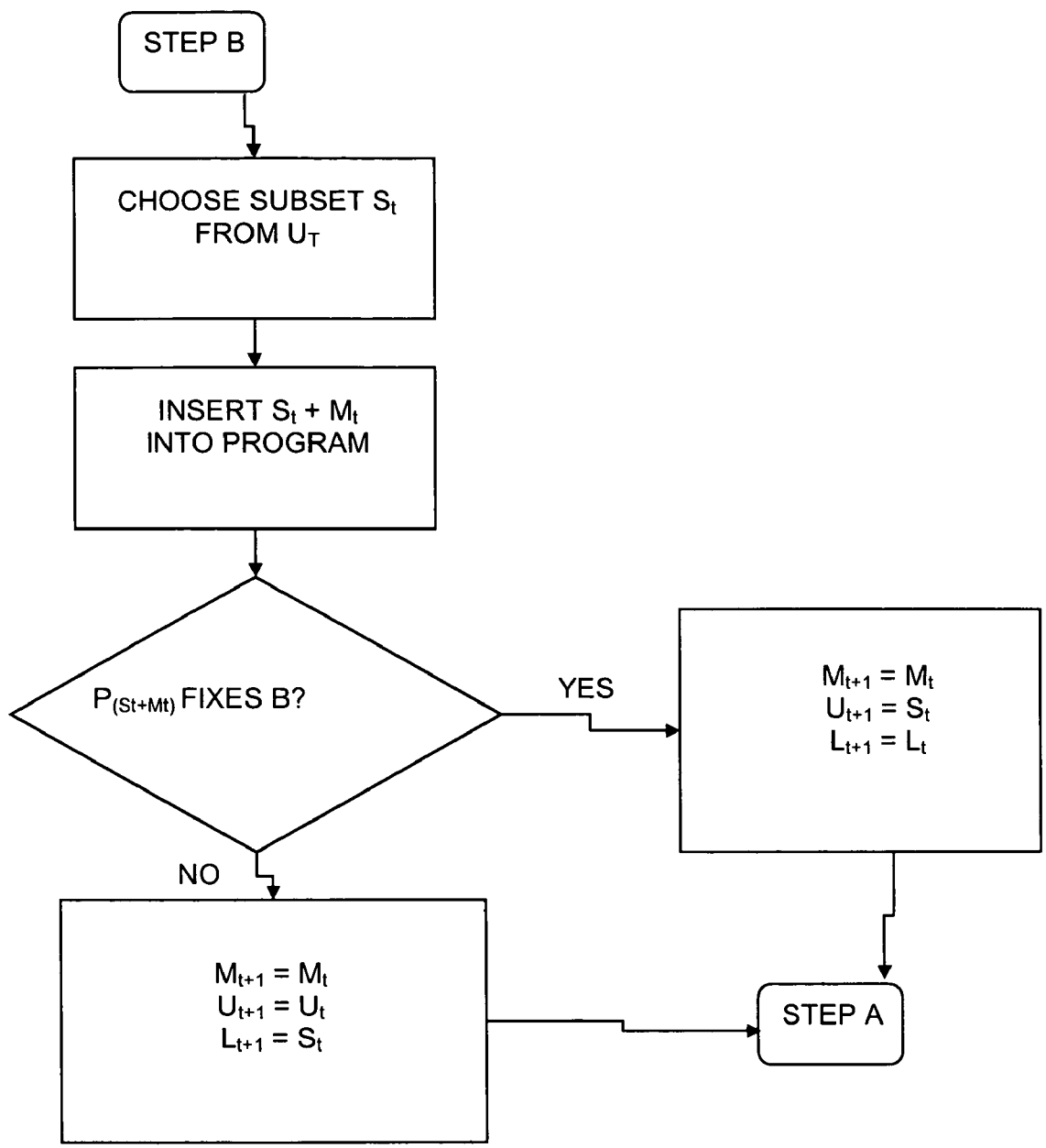
Figure 6A:
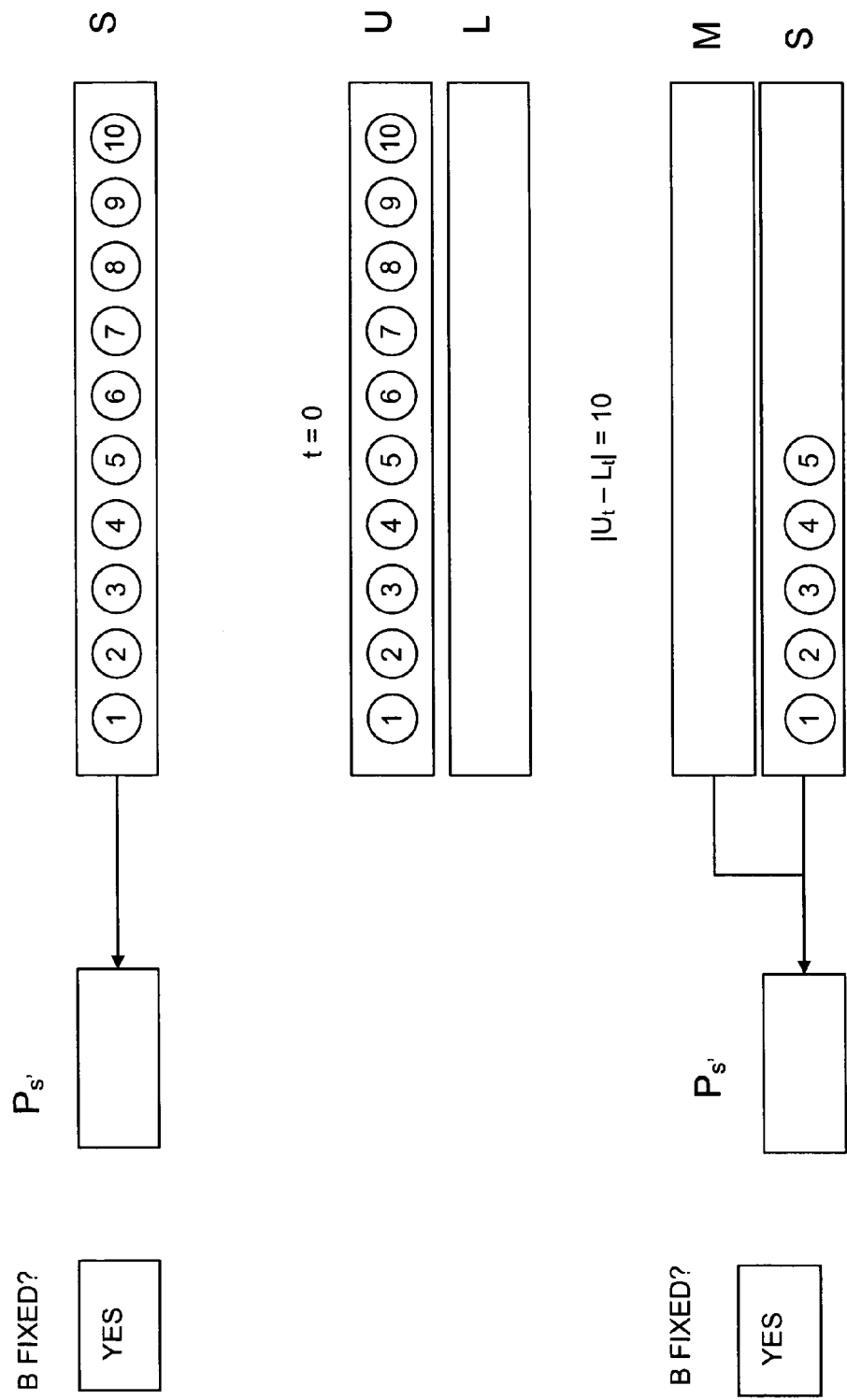
FIGS. 6A through 6I, taken together, is a simplified illustration of an exemplary implementation of the method of FIGS. 5A-5C.
Figure 6B:
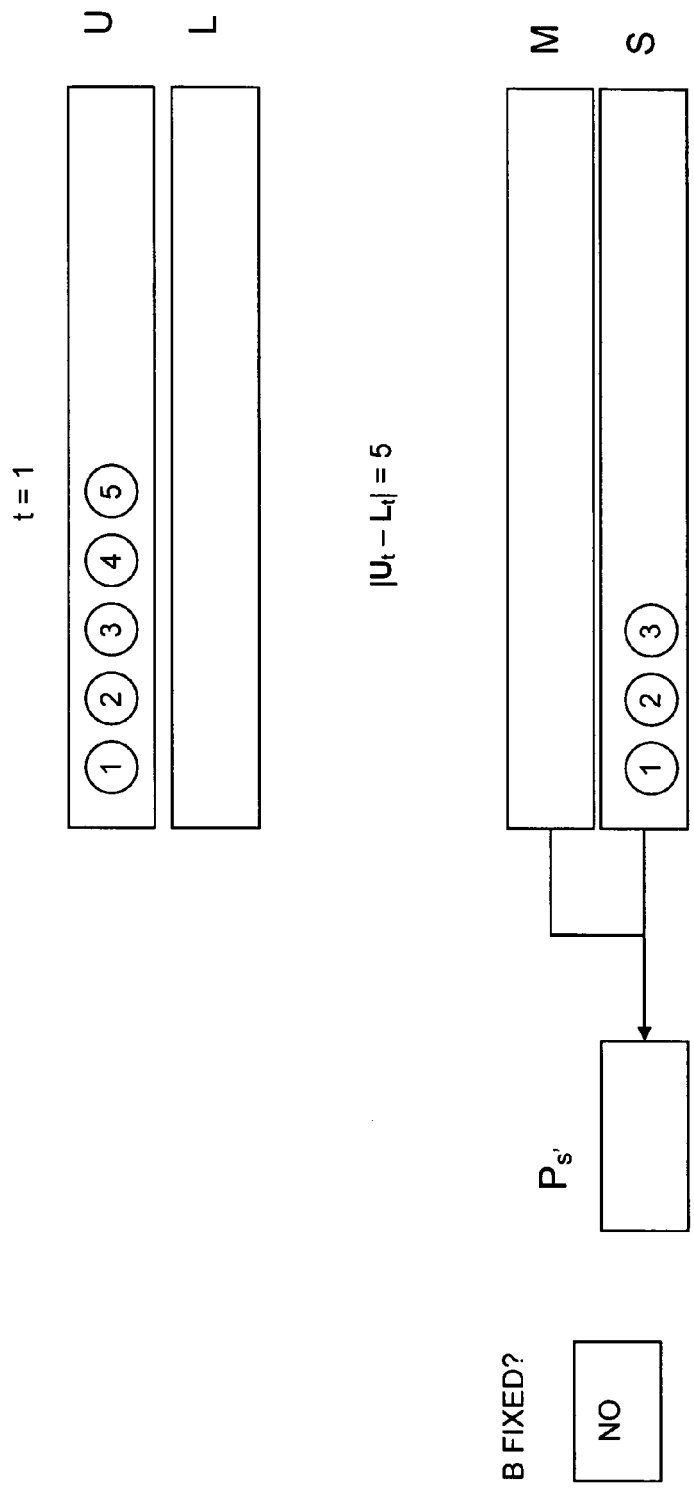
Figure 6C:
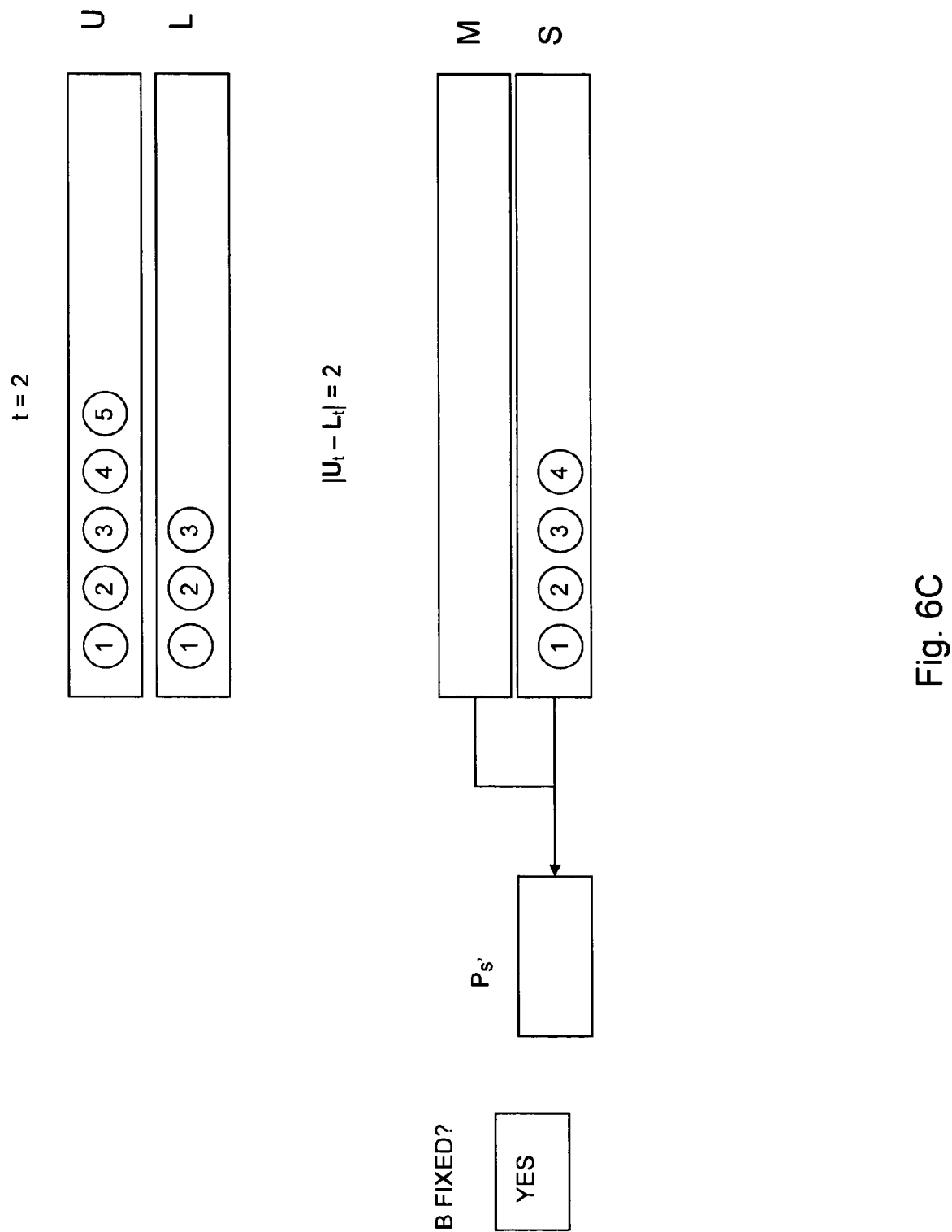
Figure 6D:
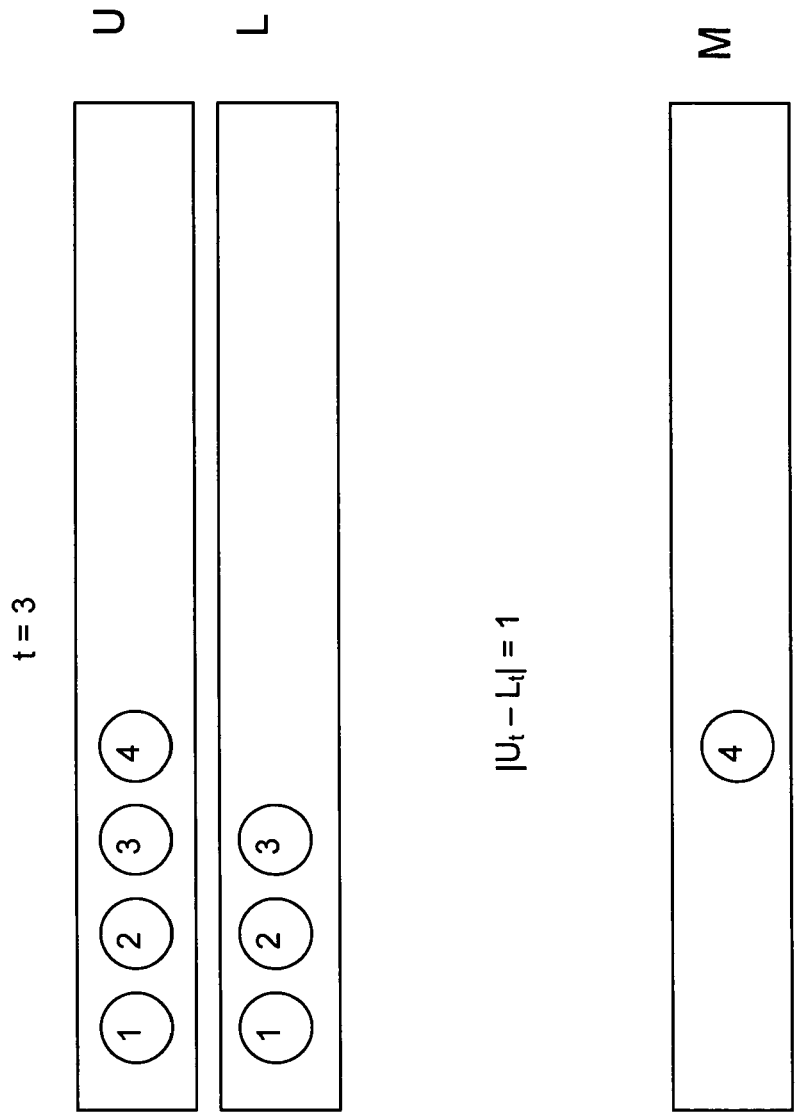
Figure 6E:
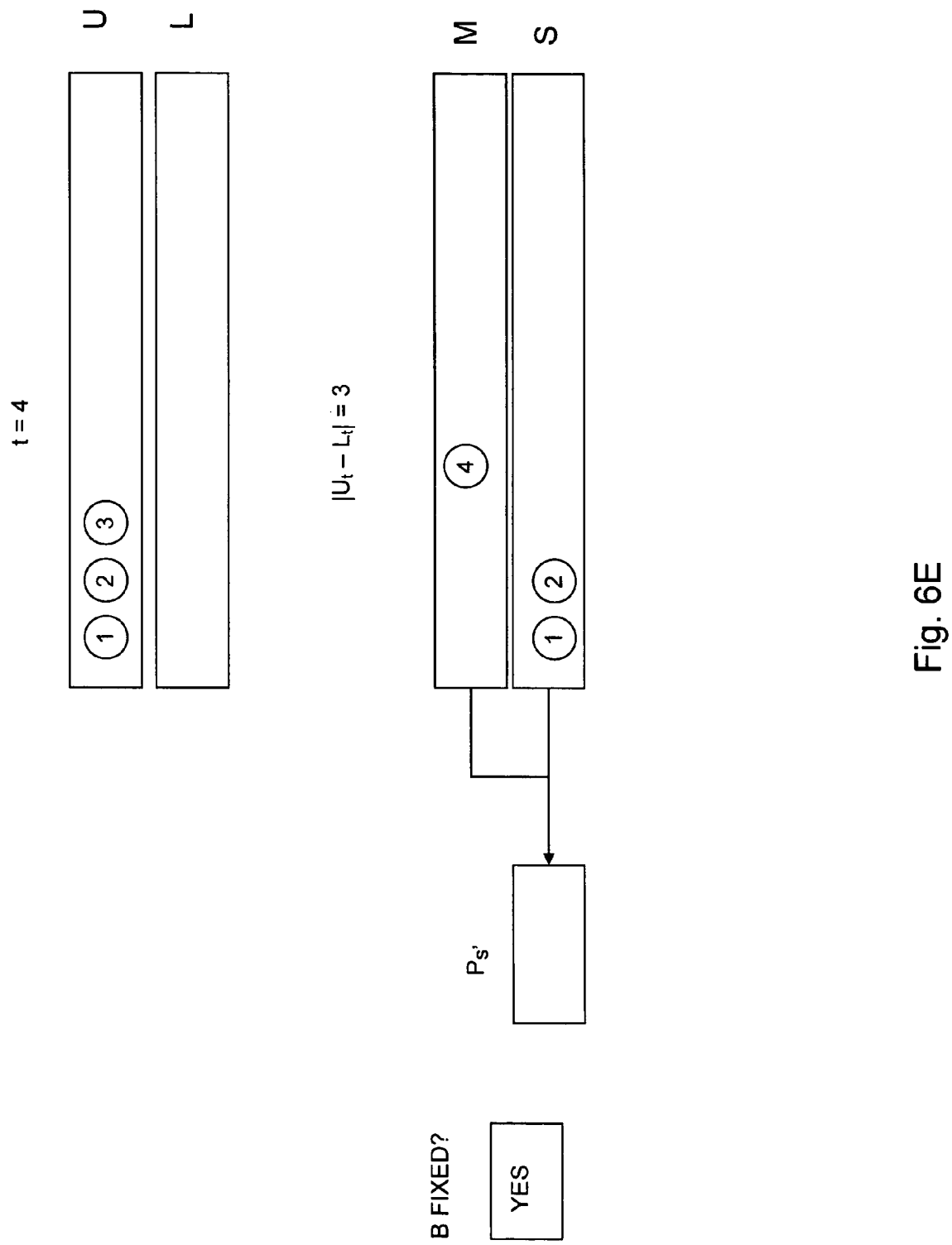
Figure 6F:
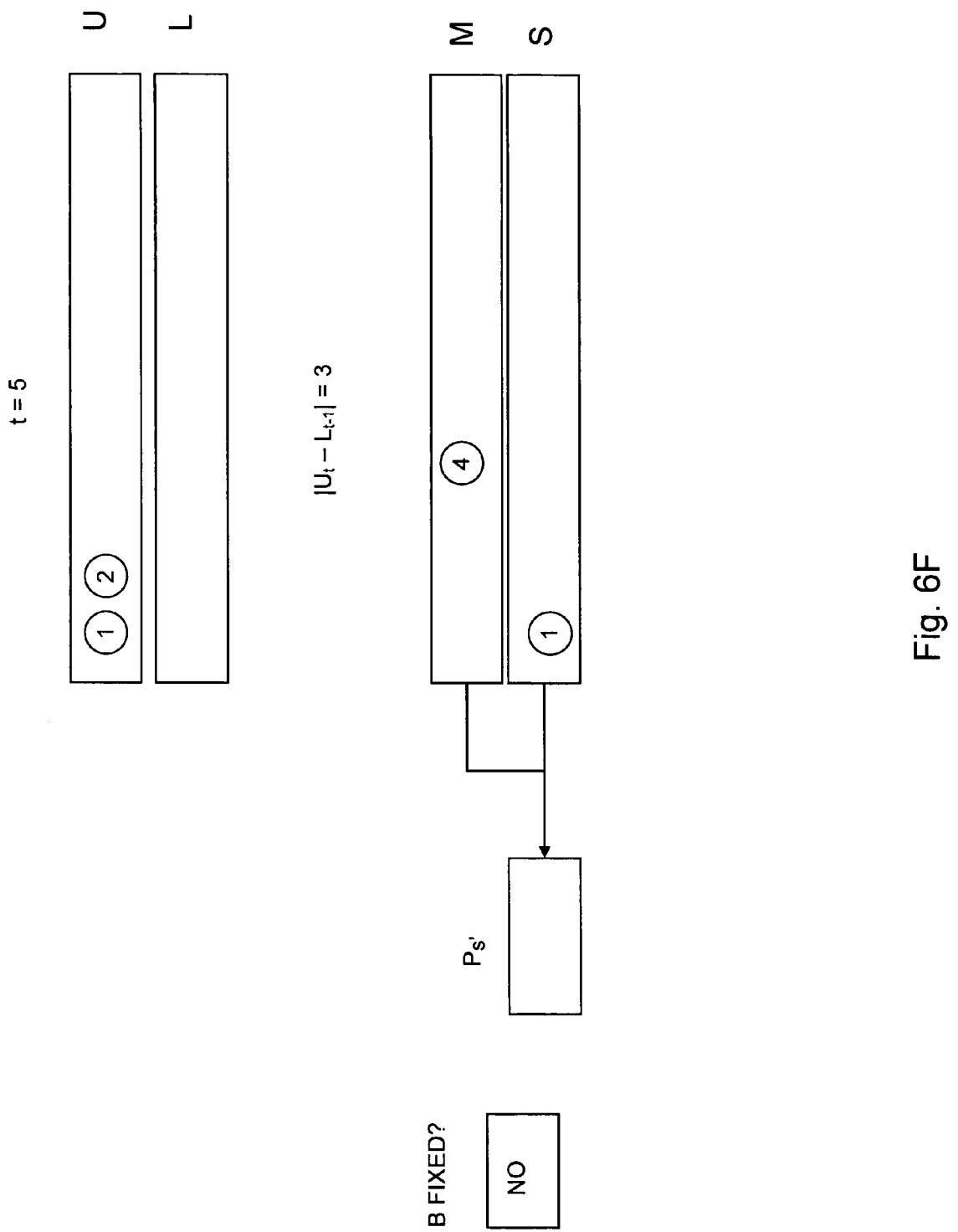
Figure 6G:
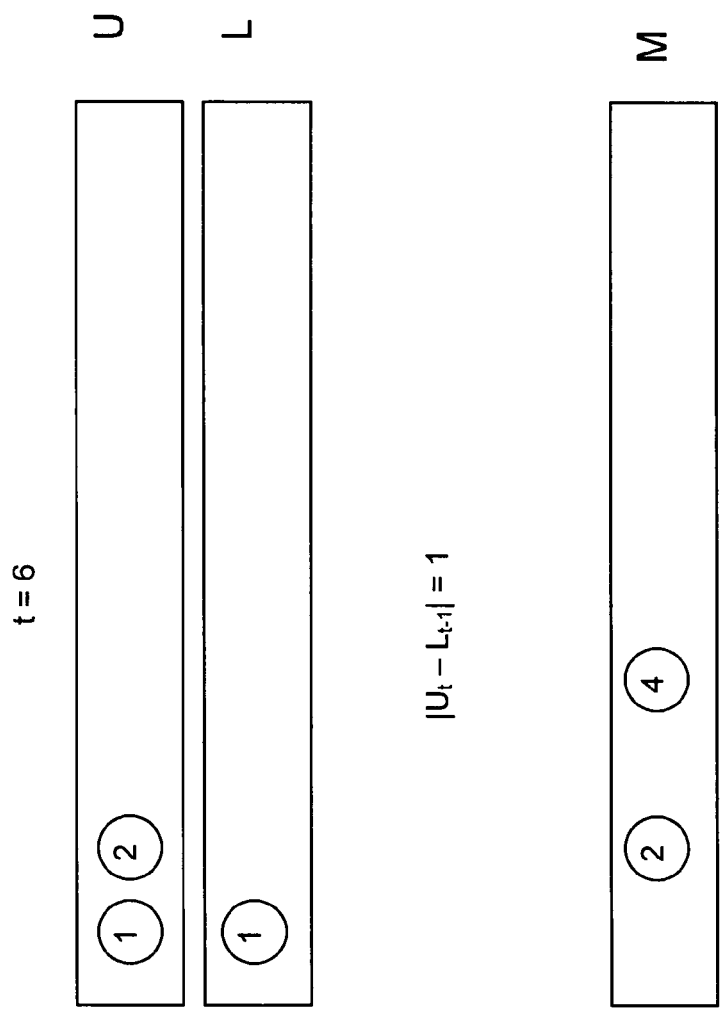
Figure 6H:
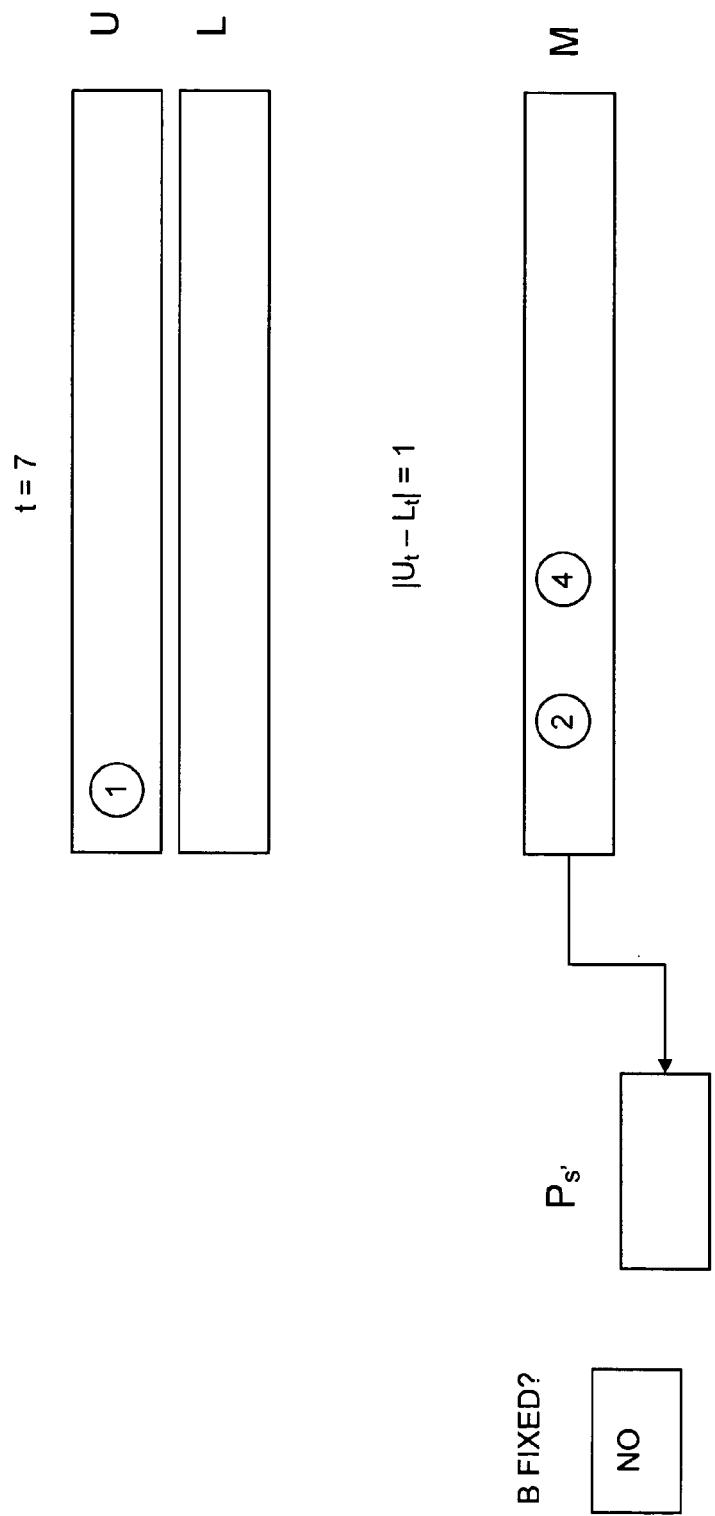
Figure 6I:
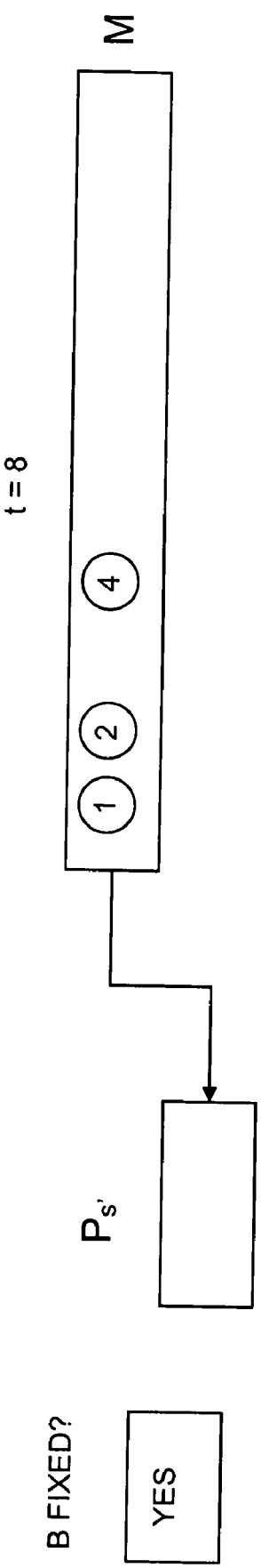

Reference is now made to FIGS. 5A-5C, which, taken together, is a simplified flowchart illustration of a method for automated bug detection and solution, operative in accordance with a preferred embodiment of the present invention. In the method of FIGS. 5A-5C, a program P, such as a multi-threaded program, may be executed a predetermined number of times. Testing Tool 200 may be used to introduce perturbations into the execution environment of program P in accordance with conventional techniques. Bug Pattern Detector 400 identifies one or more bug patterns in P using conventional techniques and provides a set S of candidate bug solutions. For a subset S' of S, $P_{S'}$ denotes program P modified according to the solutions in set S'. Solution Query & Search Module 410 employs Bug Solution Inserter 420 to insert S into program P to create program $P_S$. Solution Query & Search Module 410 then executes program $P_S$ a predetermined number of times, such as with Testing Tool 200, to test the efficacy of S, the implemented solutions. Should the solution not satisfy a predefined set Q of requirements, such as the elimination of previously detected bugs B, a different set S is preferably defined, beginning an iterative process noted by the letter t hereinbelow, by which a local optimal subset M of S is found.

Set M, initially empty, may be defined to include solutions in S identified as Required Solutions as is explained hereinbelow. At iteration t, Mt will preferably include all known Required Solutions as of this iteration. Sets $L_t$ and $U_t$ may also be defined to include Non-Required Solutions. $L_t$ and $U_t$ are subsets of S−$M_t$, such that $M_t$+$L_t$ does not eliminate the bug B but $M_t$+$U_t$ does. Initially, set $L_0$ is empty and set $U_0$ includes all of S. Preferably, $U_0$ is arbitrarily ordered to facilitate a methodology by which subsequent subsets are extracted from U. The following may then be performed:

At each iteration t:
If |$U_t$−$L_t$|=1, then
　If |$L_t$|=0
　　Should the implemented solutions of $M_t$ ($P_{Mt}$) satisfy a predefined set Q of requirements, such as the elimination of previously detected bugs B, set M=$M_t$
　　Should the solutions of $M_t$ ($P_{Mt}$) not satisfy Q, set M=$M_t$ together with the sole element of $U_t$.
　In both cases, the current iteration is the final iteration.
　Otherwise, set $M_{t+1}$=$M_t$+($U_t$−$L_t$); $L_{t+1}$=empty set; $U_{t+1}$=$L_t$, and proceed to the next iteration.
Otherwise, select a set $S_t$ such that $L_t$ is a proper subset of $S_t$ and $S_t$ is a proper subset of $U_t$, and implements the solutions of $S_t$.
　Should the implemented solutions of $S_t$ together with $M_t$ ($P_{St+Mt}$) satisfy Q of requirements, set $M_{t+1}$=$M_t$; $L_{t+1}$=$L_t$; $U_{t+1}$=$S_t$, and proceed to the next iteration.
　Should the solutions of St together with $M_t$ ($P_{St+Mt}$) not satisfy Q, set $M_{t+1}$=$M_t$; $L_{t+1}$=$S_t$; $U_{t+1}$=$U_t$, and proceed to the next iteration.

Alternatively, the iterative process may terminate after a predefined number of iterations, or once |$M_t$+$U_t$| is smaller than a predefined size, in which cases M is set to be $M_t$+$U_t$.

$S_t$ may be selected at each iteration as follows. The set S may be ordered in an arbitrary way, where S={$s_0$, $s_1$, . . . , $s_{n-1}$}. Let [k] denote the set {$s_0$, . . . , $s_{k-1}$} for k>0 and the empty set for k=0. According to the method described above, $L_0$=[0] and $U_0$=[n]. At each iteration step t, if $L_t$=[a] and $U_t$=[b], $S_t$ may be set equal to (b−a)/2, rounded upwards or downwards if necessary. It may be seen that at each step either $L_t$ or $U_t$ is left as is, or either is set equal to $S_t$. Therefore, if the selection of $S_t$ at iteration t is carried out as described above, at iteration t+1 both $L_t$ and $U_t$ are of the form [k], and the selection of $S_{t+}$ can be carried out as described herein.

Reference is now made to FIGS. 6A through 6I which, taken together, is a simplified illustration of an examplary implementation of the method of FIGS. 5A-5C. At the initialization time step, t=0, Solution Query & Search Module 410 labels the complete set of 10 solutions S, generated by Bug Pattern Detector 400, as candidate solutions and orders them as candidate solution$_1$ through candidate solution$_{10}$ in set S. Solution Query & Search Module 410 further initializes sets $M_0$ and $L_0$ as empty sets, and $U_0$ equal to S. Solution Query & Search Module 410 employs Bug Solution Inserter 420 to insert S into program P to create program $P_S$. Solution Query & Search Module 410 then executes Testing Tool 200 to determine if B is indeed resolved. In the present example S is determined to resolve B.

An iterative process then begins as follows. Solution Query & Search Module 410 tests the difference between the sizes of $U_0$ and $L_0$, and since |$U_0$−$L_0$| in this example is equal to 10, Solution Query & Search Module 410 places half of $U_0$ in subset $S_0$, i.e. candidate solution$_1$ through candidate solution$_5$, and employs Bug Solution Inserter 420 to insert $S_0$+$M_0$ into program P to create program $P_{S0}$. Solution Query & Search Module 410 then executes Testing Tool 200 to determine if program $P_{S0}$ retains bug B. In the example shown $P_{S0}$ does not retain bug B. Since the set of candidate solution$_1$ through candidate solution$_5$ fixes bug B, the remaining candidate solutions, candidate solution$_6$ through candidate solution$_{10}$, are known not to be necessary for the successful execution of program P. Solution Query & Search Module 410 sets $U_1$ to be equal to $S_0$, the set of candidate solution$_1$ through candidate solution$_5$; $L_1$ to $L_0$, the empty set; and $M_1$ to $M_0$, the empty set.

The iterative process continues as before to determine which of the other candidate solutions are required to fix bug B. The iterator t is incremented to 1, Solution Query & Search Module 410 determines that the difference between the sizes of $U_1$ and $L_1$ is 5, and half of $U_1$ is placed in subset $S_1$, i.e. candidate solution$_1$ through candidate solution$_3$. This is so because $L_1$ is empty, although in general $L_k$ is combined with half of ($U_k$−$L_k$). Bug Solution Inserter 420 inserts $S_1$+$M_1$ into program P to create program $Ps_1$. Solution Query & Search Module 410 then executes Testing Tool 200 to determine if program $Ps_1$ retains bug B. In the example shown, program $Ps_1$ retains bug B. At this point $U_2$ is set equal to $U_1$, which includes candidate solution$_1$ through candidate solution$_5$, $L_2$ is set equal to $S_1$, which includes candidate solution, through candidate solution$_3$, and $M_2$ is set equal to $M_1$, the empty set.

Iterator t is incremented to 2, and Solution Query & Search Module 410 determines that the difference between the sizes of $U_2$ and $L_2$ is greater than 1, and chooses a new subset $S_2$ from $U_2$, combining $L_2$ with half of the elements from $U_2$−$L_2$. In this example, $S_2$ is the set of candidate solution$_1$ through candidate solution$_4$ Solution Query & Search Module 410 employs Bug Solution Inserter 420 to insert $S_2$+$M_2$ into program P to create program $Ps_2$. Testing Tool 200 is then executed and determines that $S_2$ indeed fixes bug B. Hence $U_3$ is set equal to $S_2$, which includes the set of candidate solution$_1$ through candidate solution$_4$; $L_3$ is set equal to $L_2$, which includes the set of candidate solution, through candidate solution$_3$; and $M_3$ is set equal to $M_2$, the empty set.

The iterator t is incremented to 3, Solution & Search Module 410 determines that the difference between the sizes of $U_3$ and $L_3$ is 1. The sole solution in $U_3-L_3$, candidate solution$_4$, is labeled as a required solution, and joins set $M_4$, the subset of required solutions. $U_4$ is set equal to $L_3$, and $L_4$ is set equal to the empty set. Since $L_3$ is non-empty, the next iteration may be carried out.

Iterator t is incremented to 4, and since $|U_4-L_4|>1$ in this example, Solution Query & Search Module 410 chooses a new subset $S_4$ from $U_4$. In this example, $S_4$ is the set including candidate solution$_1$ and candidate solution$_2$. Solution Query & Search Module 410 employs Bug Solution Inserter 420 to insert $S_4+M_4$ into program P to create program $P_{S4}$. Testing Tool 200 is then executed and determines that $S_4+M_4$ indeed fixes bug B. $U_5$ is set equal to $S_4$, which includes the set including candidate solution$_1$ and candidate solution$_2$; $L_5$ is set equal to $L_4$, the empty set; and $M_5$ is set equal to $M_4$, which includes candidate solution.

The iterator t is incremented to 5, and since $|U_5-L_5|>1$ in this example, a subset of $U_5$ is placed in subset $S_5$, i.e. candidate solution$_1$. Bug Solution Inserter 420 inserts $S_5+M_5$ into program P to create program $P_{S5}$. Solution Query & Search Module 410 then executes Testing Tool 200 to determine if program $P_{S5}$ retains bug B. In the example shown $P_{S5}$ does retain bug B. At this point $U_6$ is set equal to $U_5$, which includes the set of candidate solution$_1$ through candidate solution$_2$; $L_6$ is set equal to $S_5$, which includes candidate solution$_1$; and $M_6$ is set equal to $M_5$, which includes candidate solution$_4$.

Iterator t is incremented to 6. At this stage a single candidate solution, the difference between $U_6$ and $L_6$ has been isolated. This solution, candidate solution$_2$, is labeled as a required solution, and joins $M_6$ to form the set $M_7$, the subset of required solutions. Next $U_7$ is set equal to $L_6$, which includes candidate solution$_1$; $L_7$ is set equal to the empty set.

Iterator t is incremented to 7, Solution & Search Module 410 determines that $|U_7-L_7|=1$, and also that $|L_7|=0$. Solution Query & Search Module 410 employs Bug Solution Inserter 420 to insert $M_7$ into program P to create program $P_{S8}$. Testing Tool 200 is then executed and determines that $M_8$ does not fix bug B. Thus, the sole element of $U_8$ is necessary for bug removal. This solution, candidate solution$_1$, is labeled as a required solution, and is joined to the set $M_8$ to obtain M, the set of required solutions that may then be used to automatically modify P or that may be suggested as a course of action to a human programmer for modifying P.

In one exemplary scenario of the present invention, Bug Pattern Detector 400 proposes to modify a multi-threaded computer program with the insertion of a synchronization point in each thread. For example, a part of a program P is defined to increment a shared variable x using two threads. The requirement Q requires that P read the value of x=2 after the threads complete. Sample pseudo-code appears as follows:

```
int x=0;
Main( )
{
  a1 = new A1( );
  a2 = new A2( );
  a1.Run( );
  a2.Run( );
  // other part of program
  ...
  join (a1); //pass this point only after a1 completes
  join (a2); //pass this point only after a2 completes
  print x; //or some other use of x; expect value of 2
```

-continued

```
}
class A1 extends Thread
{
        public Run( )
        {
          DoIncrement( );
        }
        public void DoIncrement( )
        {
          x++;
        }
}
class A2 extends Thread
{
        public Run( )
        {
          DoIncrement( );
        }
        public void DoIncrement( )
        {
          x++;
        }
}
```

Solution Query & Search Module 410 executes Testing Tool 200 on program P and determines that sometimes values of x used are smaller than 2, and thus defines bug B. Next, Solution Query & Search Module 410 utilizes Bug Pattern Detector 400 to propose candidate solutions. In this example, Bug Pattern Detector 400 proposes multiple solutions in the rest of the program in addition to two synchronizations in the DoIncrement methods of classes A1 and A2, e.g.:

```
public void DoIncrement( )
{
        synchronized
        {
          x++;
        }
}
```

Thus, the solution space is composed of multiple candidate solutions defining set S, including the synchronization of A1.DoIncrement( ), labeled candidate solution$_i$, and the synchronization of A2.DoIncrement( ), labeled candidate solution$_j$.

Solution Query & Search Module 410 performs the method described hereinabove and isolates candidate solution$_i$ and candidate solution$_j$ as fixing bug B. Thus, it is known that candidate solution$_i$ and candidate solution$_j$ together fix bug B, and that all the other candidate solutions are not necessary for the successful execution of program P and may be removed from set S.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for determining a required solution subset from a set of solutions for eliminating a computer program execution error, the method including:
    a) selecting a first candidate solution subset from a set of solutions for a computer program that produces an error when executed, wherein each of said solutions represents a different proposed modification of said program for eliminating said execution error;
    b) applying said first candidate solution subset to said computer program, thereby creating a first version of said program;
    c) selecting a second candidate solution subset from said set of solutions;
    d) applying said second candidate solution subset to said program, thereby creating a second version of said program;
    e) executing said first and second program versions to determine whether either of said executed program versions produces said error;
    f) adding the difference between said first and second candidate solution subsets to a required solution subset when:
        one of said executed program versions produces said error, and
        the other of said executed program versions does not produce said error; and
    g) applying said required solution subset to said program, thereby creating a third version of said program;
    h) executing said third program version to determine whether said executed third version of said program produces said error;
    i) if said third version of said program produces said error, repeating steps a)-h) for different candidate solution subsets until said third version of said program does not produce said error.

2. A method according to claim 1 wherein said adding step comprises adding said difference between said first and second candidate solution subsets to said required solution subset where the populations of said candidate solution subsets differ by one member.

* * * * *